UNITED STATES PATENT OFFICE.

JAMES T. McDOUGALL, OF NO. 52 GRANVILLE PARK, BLACKHEATH, COUNTY OF KENT, ENGLAND.

PURIFICATION OF COAL-GAS.

SPECIFICATION forming part of Letters Patent No. 292,341, dated January 22, 1884.

Application filed March 21, 1883. (No specimens.) Patented in England February 23, 1883, No. 995.

*To all whom it may concern:*

Be it known that I, JAMES THOMAS MC-DOUGALL, a subject of the Queen of Great Britain, and a member of the firm of McDougall Brothers, of Manchester, county of Lancaster, and London, county of Middlesex, England, and a resident of Blackheath, in the county of Kent, England, have invented certain improvements in the purification of coal-gas and in the preparation and treatment of materials to be employed therein, (for which I have obtained a patent in Great Britain, No. 995, dated February 23, 1883,) of which the following is a specification.

This invention has reference more particularly to the removal of sulphureted hydrogen from coal-gas by means of iron oxide and to the revivification and reuse of the same.

It consists, first, in the preparation and use of a particular kind of iron oxide for this purpose. It is well known that the purifying capacity of the oxide is dependent in great measure upon what may be termed its "physical," "chemico-physical," and "molecular" condition, due to the mode of preparation, the materials employed, and the like, so that all oxides or peroxides of iron do not have the same capacity. Heretofore native oxide of iron has been most commonly employed; but it is comparatively inefficient on account of the small proportion of hydrated peroxide of iron and the large proportion of water contained in it. The precipitated oxide has also been used—as, for example, a mixture of copperas and lime; also, lime treated with copperas liquor; also, a mixture of copperas and lime or the carbonate thereof, or of other alkaline earth, heated to redness to dissipate the water of hydration, precipitated oxide made into a paste, molded, and dried, and other compounds have been used or their use suggested. The iron oxide prepared in accordance with this part of the invention is a dry red powder, light and porous. It works well from the first time it is placed in the purifiers, revivifies rapidly, and absorbs after repeated employments more than sixty per cent. of sulphur, so that it can usefully be employed for the production of sulphuric acid. It is prepared by precipitation from a solution of iron sulphate by means of lime or the carbonate thereof in a finely-divided state, and by collecting the precipitate and drying the same by exposure to air. The drying is or may be hastened by simple artificial means. Other modes of preparation may be adopted, as hereinafter expressed. The use of a carbonate as the precipitating agent is preferred as giving better results, and it is specially claimed.

The invention secondly consists in preparing a material which is adapted, by admixture with purifying agents, to render the same more easily penetrated by the gas to be purified, and which shall at the same time itself serve as an active purifying agent. To this end sawdust or other granular porous organic substance is impregnated with hydrated peroxide of iron by treating it first with a solution of a salt of iron, and then decomposing the latter in the pores of said substance by lime or other suitable reagent. Heretofore sawdust, sponge, and other materials have been mixed with iron oxide, and also with lime, which has subsequently been treated with copperas liquor. In none of these cases, however, is iron oxide precipitated in the pores of the material. Iron oxide has, however, been precipitated in the pores or on the surface of brick, (or it has been proposed so to do;) but this, on account of its weight and small porosity due to its inorganic nature, is essentially different from sawdust. The impregnated sawdust is dried by exposure to air, with or without the aid of artificial heat. It is evident that it may be mixed with various purifying agents, as, for example, with all kinds of iron oxide.

The invention thirdly consists in the admixture of the light, dry, and porous powder, prepared in accordance with the first part of the invention, with the impregnated sawdust or its equivalent.

The invention fourthly has reference to the preparation of iron oxide for reuse. It consists in mixing the residue, after burning, to drive out the sulphur, with sufficient lime or the carbonate thereof, or equivalent reagent, to neutralize the acidity resulting from the burning. Heretofore the burned spent oxide has been mixed with lime, (or such mixture has been proposed,) but the latter is to be used in large excess of the neutralizing proportion, so that its presence would interfere greatly with the purifying properties of the mixture. The same mode of preparation for reuse may be applied to other spent oxides, and as well also to the residues of burned pyrites.

The invention fifthly consists in the admixture of freshly-prepared hydrated peroxide of iron with the burned spent oxide, prepared as just described.

The following is a more particular description of the manner of carrying the invention into effect: Prepare a strong solution of sulphate of iron (ferrous sulphate) by dissolving iron of any form—scrap wrought-iron is suitable—in sulphuric acid. Into it place sufficient carbonate of lime, or lime, to unite with the whole of the sulphuric acid in the solution. The iron is precipitated as hydrated oxide. The precipitate being collected and exposed to the air is converted into hydrated peroxide of iron. The resulting product is a dry red powder, light and porous. If the strength of the sulphuric acid has not been reduced before use, the resulting mixture will become hot, and must then be gradually cooled down. Sawdust, tanners' refuse, or other light porous material of an organic nature is impregnated with any of the soluble salts of iron, and then treated with an alkaline reagent until neutral, whereby they become saturated to a greater or less degree with precipitated peroxide of iron. This impregnated sawdust is mixed with the light powder before described in any convenient proportions, and the mixture is spread on the trays of the purifier in any ordinary or suitable way. The material is revivified from time to time by exposure to air. When it has absorbed nearly or quite the maximum quantity of sulphur, it is or may be burned in sulphur-furnaces. The burned residue has an acid reaction, and in this condition is unsuited for gas-purification. The acidity of the residue is neutralized with lime or other suitable alkaline reagent, and it then becomes suited to the purposes of my invention. The neutral residue is mixed with the light powder and the impregnated sawdust, prepared as before described. The objection to all mixtures containing excess of lime is that, when the material is placed in the purifiers this becomes converted into carbonate or sulphide, so that when the material is afterward exposed to the air, revivification is impossible.

Instead of preparing a solution of sulphate of iron by dissolving iron in sulphuric acid, a strong solution of the sulphate of iron of commerce may be used, and to it the carbonate of lime, or lime, is added, or the sulphate in a dry powdered form may be mixed with the carbonate of lime, or lime in dry powder. In both these cases it is desirable to agitate or stir the mixture well to insure that all the acid present shall combine with the lime. The mixture or precipitate is then exposed to the air and dried, the drying being hastened, if desired, by simple artificial means. Waste solutions of sulphate of iron produced in the process of cleaning iron for galvanizing or tinning may be utilized.

Instead of using a solution of ferrous sulphate, a solution of the ferrous chloride or muriate of iron may be used. It can be obtained by dissolving iron in muriatic acid, or by making a solution of the muriate of iron of commerce, or waste solutions may be employed. Solutions of the muriate of manganese may also be employed. Precipitation is effected, as before, by addition of carbonate of lime, or lime. The precipitate should be washed to remove the deliquescent muriate of lime, (calcium chloride.)

It is evident that parts of the invention may be used separately or two or more together, as well as all in combination, as hereinbefore more particularly set forth.

I am aware that jewelers' rouge is made by precipitating iron oxide from solutions of iron salts; but the present invention has nothing to do with the preparation of such material, being confined to the purification of gas.

I claim—

1. The improvement in gas purification, consisting in precipitating hydrated oxide of iron from a salt of iron with lime or the carbonate thereof, exposing to air and drying the precipitate, and so converting it into a light and porous dry red powder of hydrated peroxide of iron, and subjecting the gas to be purified to the action of such powder, substantially as described.

2. The improvement in gas purification, consisting in subjecting the gas to be purified to the action of precipitated hydrated peroxide of iron in the form of light and porous dry red powder obtained in the manner and by the means described.

3. The method of preparing a material for use in gas purification by saturating or impregnating sawdust, tanners' refuse, or other light porous organic material with a soluble salt of iron, and then decomposing the said salt with an alkaline reagent, so as to deposit iron oxide in the pores thereof, substantially as described.

4. The mixture of sawdust, tanners' refuse, or other light porous organic material impregnated with iron oxide deposited in the pores thereof, with a purifying agent—such as hydrated peroxide of iron—substantially as described.

5. The mixture of sawdust, tanners' refuse, or other light porous organic material impregnated with iron oxide, and in a dry state, with the light and porous dry powder of hydrated peroxide of iron, hereinbefore described, as a new material or composition.

6. The method of preparing burned spent oxide or analogous burned spent composition of iron and sulphur for gas purification, by neutralizing the acidity thereof with lime, excess of the latter being avoided, substantially as described.

7. The mixture of the neutralized burned spent oxide with freshly-prepared hydrated peroxide of iron, substantially as described.

8. The mixture of the burned spent oxide neutralized with lime, the sawdust, or its equivalent, impregnated with iron oxide, and the light and porous dry powder of hydrated peroxide of iron, substantially as described.

In testimony whereof I have signed my name to this specification in the presence of two subscribing witnesses.

JAMES THOMAS McDOUGALL.

Witnesses:
W. I. WEEKS,
CHARLES DODGE,
    *Both of* 31 *Lombard Street, London.*